United States Patent
Zheng

(10) Patent No.: US 10,210,002 B2
(45) Date of Patent: *Feb. 19, 2019

(54) METHOD AND APPARATUS OF PROCESSING EXPRESSION INFORMATION IN INSTANT COMMUNICATION

(71) Applicant: Alibaba Group Holding Limited, Grand Cayman (KY)

(72) Inventor: Yuanlong Zheng, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 15/408,812

(22) Filed: Jan. 18, 2017

(65) Prior Publication Data

US 2017/0123823 A1 May 4, 2017

Related U.S. Application Data

(63) Continuation of application No. 14/596,019, filed on Jan. 13, 2015, now Pat. No. 9,584,455.

(30) Foreign Application Priority Data

Jan. 15, 2014 (CN) .......................... 2014 1 0018262

(51) Int. Cl.
*H04L 12/58* (2006.01)
*G06T 13/80* (2011.01)
(Continued)

(52) U.S. Cl.
CPC .......... *G06F 9/451* (2018.02); *G06F 3/0482* (2013.01); *G06T 13/80* (2013.01); *H04L 51/04* (2013.01);
(Continued)

(58) Field of Classification Search
CPC .......... H04L 51/00; H04L 51/08; H04L 51/18
(Continued)

(56) References Cited

U.S. PATENT DOCUMENTS 6,990,452 B1 * 1/2006 Ostermann .......... G06F 17/241
345/473
7,908,554 B1 3/2011 Blattner
(Continued)

FOREIGN PATENT DOCUMENTS

| JP | 2006338685 | 12/2006 |
|---|---|---|
| JP | 2006352309 | 12/2006 |
| WO | WO2004023336 | 3/2004 |

OTHER PUBLICATIONS

Office action for U.S. Appl. No. 14/596,019, dated Jul. 1, 2016, Zheng, "Method and Apparatus of Processing Expression Information in Instant Communication", 14 pages.
(Continued)

*Primary Examiner* — Kimberly A Williams
(74) *Attorney, Agent, or Firm* — Lee & Hayes, PC

(57) ABSTRACT

A method provides an expression picture in an instant communication conversation window; acquires information of a user operation activity information from a sending user with respect to the expression picture; searching a first expression database based on the expression picture and the acquired information of the user operation activity; generates a first response message corresponding to the expression picture under the user operation activity; and sends found information related to the expression picture and the acquired information of the user operation activity to a receiving client corresponding to a receiving user to facilitate the receiving client to generate a second response message corresponding to the expression picture under the user operation activity.

19 Claims, 15 Drawing Sheets

(51) Int. Cl.
    *G06F 9/451* (2018.01)
    *G06F 3/0482* (2013.01)
(52) U.S. Cl.
    CPC .............. *H04L 51/08* (2013.01); *H04L 51/18* (2013.01); *H04L 51/02* (2013.01); *H04L 51/10* (2013.01); *H04L 51/32* (2013.01)
(58) Field of Classification Search
    USPC ................... 345/473; 709/206; 715/706, 758
    See application file for complete search history.

(56) References Cited

U.S. PATENT DOCUMENTS

| | | | |
|---|---|---|---|
| 8,881,030 B2 | 11/2014 | Jones et al. | |
| 9,576,175 B2* | 2/2017 | Chembula | G06K 9/00 |
| 2002/0180738 A1 | 12/2002 | Shibata et al. | |
| 2004/0162877 A1* | 8/2004 | Van Dok | G06F 3/0481 |
| | | | 709/204 |
| 2005/0163379 A1* | 7/2005 | Zimmermann | G06Q 10/107 |
| | | | 382/190 |
| 2007/0113181 A1 | 5/2007 | Blattner et al. | |
| 2007/0168863 A1 | 7/2007 | Blattner et al. | |
| 2008/0147819 A1 | 6/2008 | Dettinger et al. | |
| 2008/0163074 A1 | 7/2008 | Tu | |
| 2009/0013265 A1 | 1/2009 | Cole et al. | |
| 2009/0016617 A1* | 1/2009 | Bregman-Amitai | ........................ |
| | | | G06K 9/00281 |
| | | | 382/229 |
| 2009/0019117 A1 | 1/2009 | Bonforte et al. | |
| 2010/0235451 A1 | 9/2010 | Yu et al. | |
| 2012/0059787 A1* | 3/2012 | Brown | G06F 17/241 |
| | | | 706/52 |
| 2012/0130717 A1 | 5/2012 | Xu et al. | |
| 2012/0162350 A1 | 6/2012 | Lee et al. | |
| 2012/0270578 A1 | 10/2012 | Feghali | |
| 2012/0327091 A1 | 12/2012 | Eronen et al. | |
| 2013/0002683 A1 | 1/2013 | Li et al. | |
| 2013/0060875 A1 | 3/2013 | Burnett et al. | |
| 2013/0147933 A1* | 6/2013 | Kulas | H04N 21/41407 |
| | | | 348/61 |
| 2013/0290446 A1 | 10/2013 | Blattner et al. | |
| 2014/0082198 A1 | 3/2014 | Blattner et al. | |
| 2014/0088954 A1 | 3/2014 | Shirzadi et al. | |
| 2014/0351720 A1* | 11/2014 | Yin | H04N 7/157 |
| | | | 715/758 |
| 2015/0149925 A1 | 5/2015 | Weksler et al. | |
| 2015/0200881 A1 | 7/2015 | Zheng | |
| 2016/0050169 A1* | 2/2016 | Ben Atar | H04M 1/72544 |
| | | | 709/206 |
| 2017/0263248 A1* | 9/2017 | Gruber | G10L 15/22 |
| 2017/0344224 A1* | 11/2017 | Kay | G06F 3/04817 |

OTHER PUBLICATIONS

PCT Search Report and Written Opinion dated May 5, 2015 for PCT Application No. PCT/US15/11243, 14 Pages.

The Extended European Search Report dated Aug. 16, 2017 for European Patent Application No. 15737748.2, 8 pages.

Translated Chinese Office Action dated May 9, 2018 for Chinese Application No. 201410018262.0, a corresponding foreign application of U.S. Appl. No. 14/596,019, 9 pages.

Japanese Office Action dated Dec. 4, 2018 for Japanese Patent Application No. 2016-544859, a counterpart of U.S. Patent No. 9,584,455, 13 pages.

* cited by examiner

METHOD AND APPARATUS OF PROCESSING EXPRESSION INFORMATION IN INSTANT COMMUNICATION

CROSS REFERENCE TO RELATED PATENT APPLICATION

This application is a continuation of U.S. application Ser. No. 14/596,019 filed Jan. 13, 2015, which claims foreign priority to Chinese Patent Application No. 201410018262.0 filed on Jan. 15, 2014, entitled "Method and Apparatus of Processing Expression Information in Instant Communication", which applications are hereby incorporated by reference in their entirety.

TECHNICAL FIELD

The present disclosure relates to the field of instant communication, and more particularly, to expression information processing methods and apparatuses during instant communication.

BACKGROUND

With the continuous development of communication technology, people may communicate with one another at any time and any place through mobile terminals. Originally, communication modes performed through terminal equipment mainly comprise short messages, multimedia messages and telephones, but these communication modes are costly for users. With the promotion of technologies such as 3G (3rd-generation), WiFi (wireless fidelity) and the like, the reduction in the network flow cost and the rapid expansion of intelligent mobile terminals, a large number of products are developed in the field of mobile terminal communication, which include communication products of mobile terminals (comprising instant communication products, or other products, such as games with an instant communication function).

Unlike such communication modes as short messages and telephones, communication products on mobile terminals may organize users as a virtual social network, in which the users may send text/voice messages and pictures or transfer a number of files with each other, etc., and the information can be arrived in real time as long as the opposite party is online. This type of virtual social network facilitates the communication between people and further reduces the communication cost.

The main carrier of traditional communication products for transmitting information among users is text, which can be provided with simple expression pictures under certain scenarios in order to help the users express their sentiment. The use of an expression picture makes an interaction process more interesting. However, in existing technologies, such expression is often an expression of an individual emotion. For example, when a certain user A sends a "show-off" expression, the opposite party can generally send a "disdain" expression as a response only, and the expressions are independent from each other. This may largely limit the expressions of users' emotions. Therefore, the urgent technical problem to be solved by one skilled in the art is: how to improve communication products in order to help users express respective emotions vividly and enhance a degree of simulation of face-to-face communication between users in a real world.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus of processing expression information during instant communication, by which an instant communication tool can improve degrees of simulation of users in a real world.

The present disclosure provides the following solutions.

A method of processing expression information of a sending client in an instant communication process, wherein expression pictures, response messages and respective operation activity information used for starting the response messages have been set up in a first expression database in advance, the method comprising:

providing an expression picture in an instant communication conversation window;

acquiring information associated with user operation activity that is sent from a user with respect to the expression picture;

searching the first expression database based on the expression picture and the acquired information of the user operation activity and generating a first response message that is found to be corresponding to the expression picture under the user operation activity; and sending the found message relating to the expression picture and the acquired information of the user operation activity to a receiving client corresponding to a receiving user to facilitate the receiving client to generate a second response message corresponding to the expression picture under the user operation activity.

A method of processing expression information of a receiving client in an instant communication process, wherein expression pictures, response messages and respective operation activity information for starting the response messages have been set up in a second expression database in advance, the method comprising:

providing an expression picture in an instant communication conversation window;

acquiring a message indicating that an opposite user has operated on the expression picture from an opposite client, the message including information relating to the expression picture and information of user operation activity; and searching the second expression database based on the information relating to the expression picture and the user operation activity information, and generating a second response message corresponding to the expression picture under the user operation activity.

A method of processing expression information of a sending client during an instant communication, wherein a third expression database is set up in a server side in advance, and the third expression database stores expression pictures, response messages and operation activity information for starting the response messages, the method comprises:

providing an expression picture in an instant communication conversation window;

acquiring information of a user operation activity sent from a user with respect to the expression picture;

uploading the acquired information of the user operation activity, information relating to the expression picture, identification information of the user and identification information of a receiving user to a server to facilitate the server search the third expression database based on the acquired information of the user operation activity to generate a first response message and a second response message corresponding to the expression picture under the user operation activity, return the first response message to a sending client corresponding to the user, and send the second response message to a receiving client corresponding to the receiving user.

A method of processing expression information in an instant communication process, wherein corresponding relationships among expression pictures, response messages and conditions for starting the response messages have been set up in a fourth expression database in advance, the method comprises:

providing an expression picture in an instant communication conversation window;

examining whether a target content in conformity with a response message initialization condition corresponding to the expression picture exists in an instant communication conversation message if the expression picture exists in the fourth expression database; and if exists, generating a response message corresponding to the expression picture.

An expression information processing method in an instant communication process, wherein an association relationship between text communication contents has been set up in a fifth expression database in advance, and expression pictures corresponding to mutually associated text communication contents, the method comprises:

providing a text communication content in an instant communication conversation window;

determining whether other text communication contents that are associated with the text communication content exist in the instant communication conversation window by examining the fifth expression database; and if exist, providing corresponding expression pictures in the instant communication conversation window.

An apparatus of processing expression information of a sending client in an instant communication process, wherein expression pictures, response messages and respective operation activity information for starting the response messages have been set up in a first expression database in advance, the apparatus comprises:

a first expression picture provision unit used for providing an expression picture in an instant communication conversation window;

a first operation activity information acquisition unit used for obtaining information of a user operation activity sent from a user with respect to the expression picture;

a first retrieval unit used for searching the first expression database based on the expression picture and the obtained information of the user operation activity and generating a first response message that is found to be corresponding to the expression picture under the user operation activity; and a first sending unit used for sending the found message relating to the expression picture and the obtained information of the user operation activity to a receiving client corresponding to a receiving user to facilitate the receiving client to generate a second response message corresponding to the expression picture under the user operation activity.

An apparatus of processing expression information of a receiving client in an instant communication process, wherein expression pictures, response messages and respective operation activity information for starting the response messages have been set up in a second expression database in advance, the apparatus comprises:

a second expression picture provision unit used for providing an expression picture in an instant communication conversation window;

a second operation activity information acquisition unit used for obtaining a message indicating that an opposite user has operated on the expression picture from an opposite client, the message including information relating to the expression picture and information of user operation activity; and a second retrieval unit used for searching the second expression database based on the information relating to the expression picture and the user operation activity information, and generating a second response message corresponding to the expression picture under the user operation activity.

An expression information processing apparatus of a sending client in an instant communication process, wherein a third expression database is set up in a server side in advance, and the third expression database stores expression pictures, response messages and operation activity information for starting the response messages, the apparatus comprises:

a third expression picture provision unit used for providing an expression picture in an instant communication conversation window;

a third operation activity information acquisition unit used for obtaining information of a user operation activity sent from a user with respect to the expression picture; and an information uploading unit used for uploading the acquired information of the user operation activity, information relating to the expression picture, identification information of the user and identification information of a receiving user to a server to facilitate the server search the third expression database based on the acquired information of the user operation activity to generate a first response message and a second response message corresponding to the expression picture under the user operation activity, return the first response message to a sending client corresponding to the user, and send the second response message to a receiving client corresponding to the receiving user.

An expression information processing apparatus in an instant communication process, wherein corresponding relationships among expression pictures, response messages and conditions for starting the response messages have been set up in a fourth expression database in advance, the apparatus comprises:

a fourth expression picture provision unit used for providing an expression picture in an instant communication conversation window;

a detection unit used for examining whether a target content in conformity with a response message initialization condition corresponding to the expression picture exists in an instant communication conversation message if the expression picture exists in the fourth expression database; and a response message generation unit used for generating a response message corresponding to the expression picture if affirmative.

An expression information processing apparatus in an instant communication process, wherein an association relationship between text communication contents has been set up in a fifth expression database in advance, and expression pictures corresponding to mutually associated text communication contents, the apparatus comprises:

a text communication content provision unit used for providing a text communication content in the instant communication conversation window;

a third retrieval unit used for determining whether other text communication contents that are associated with the text communication content exist in the instant communication conversation window by examining the fifth expression database; and a fifth expression picture provision unit used for providing corresponding expression pictures in the instant communication conversation window if affirmative.

According to embodiments of the present disclosure, the present disclosure discloses the following technical effects:

Through the embodiments of the present disclosure, when performing an operation on an expression picture, a user may determine and play corresponding response messages, which may therefore be equivalent to the expression picture being responsive to the operation of the user so that the expression picture sent by the user may express the feelings of the user in a better manner, thus improving a simulation degree of an instant communication tool with respect to real-world users. Of course, any product for implementing the present disclosure does not necessarily achieve all the foregoing advantages at the same time.

BRIEF DESCRIPTION OF THE DRAWINGS

Drawings that are used by the embodiments are briefly described herein in order to make the embodiments of the present disclosure or technical solutions in existing technologies more clearly. The described drawings are merely some embodiments of the present disclosure, and one of ordinary skill in the art may acquire, under the premise of not contributing creative effort, other drawings based on these drawings.

FIG. 7-1 is a third interface diagram according to the embodiments of the present disclosure.

FIG. 7-2 is a fourth interface diagram according to the embodiments of the present disclosure.

FIG. 8-1 is a fifth interface diagram according to the embodiments of the present disclosure.

FIG. 8-2 is a sixth interface diagram according to the embodiments of the present disclosure.

DETAILED DESCRIPTION

Figure 1:
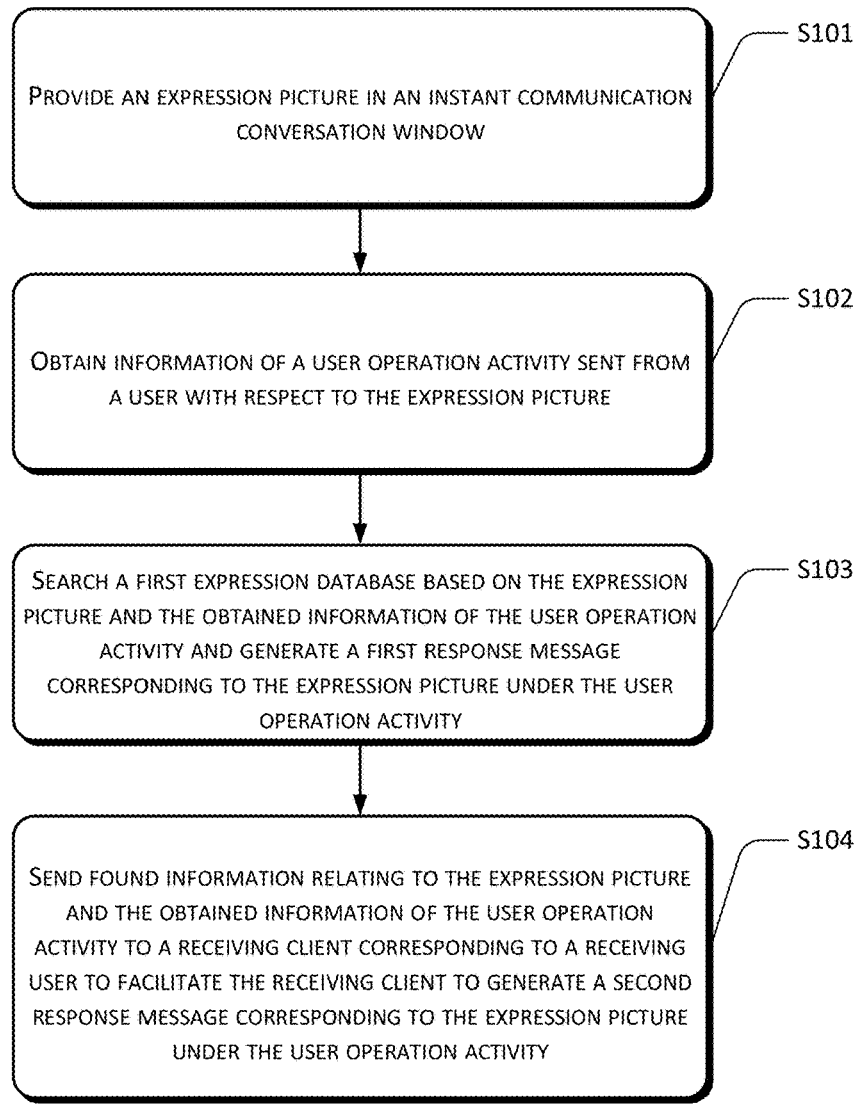
FIG. 1 is a flow chart of a first method according to the embodiments of the present disclosure.

A clear and complete description of the technical schemes in the embodiments of the present disclosure is made in conjunction with the accompanying drawings in the embodiments of the present disclosure. The described embodiments are merely a part and not all of the embodiments of the present disclosure. Based on the embodiments of the present disclosure, all other embodiments acquired by one of ordinary skill in the art are within the scope of protection of the present disclosure.

In the embodiments of the present disclosure, in order to enable a user to interact with a user on the other side in a better manner when using an instant communication tool and to express his/her emotion more conveniently through the instant communication tool, certain special expression pictures may be added into an expression database of the instant communication tool. After the user sends the expression pictures, a feedback on the user operation associated with the expression pictures may be made to play an animation or music correspondingly. For example, after a user A sends a 'heart-broken and tearful' expression to a user B, the user B may perform an operation (for example, sliding) on a touchscreen, and correspondingly, a 'hand' may appear on the expression picture and perform an action of "fondling", just like pacifying another party in the real world. This makes the instant communication tool to have a higher degree of simulating human-to-human interaction in the real world, and facilitate expressing the emotion of users.

It should be noted that, in the embodiments of the present disclosure, there may be two specific modes for implementation of expression, one between a user and an expression, i.e., a user conducts an operation (such as sliding, clicking and the like) on an expression and an expression picture performs a corresponding feedback; the other one between an expression and an expression/text. For example, after a user sends an expression picture, a user on the other side may reply with another expression picture. If the two expression pictures are correlated with each other, another response may be made. The specific implementation mode of "a user and an expression" will be introduced in detail as follows.

First Embodiment

In the first embodiment, a perspective of a sending client is firstly introduced. It should be noted that the so-called sending client is referred to a client where a user who performs a user operation activity is located. Correspondingly, the other side of a conversation is referred to as a receiving client. It should be noted that a sending party and a receiving party are not fixed in an instant communication process. The two conversation parties can be a sending party or a receiving party in a communication process, and respective roles may be continually interchanged. In addition, for a client-side program, when a user installs the client-side program, the same client-side program may implement a sending function and a receiving function. Therefore, in the embodiment of the present disclosure, concepts of a sending party and a receiving party are differentiated from the perspective of information processing entities so as to clearly describe an interaction process.

Referring to FIG. 1, an expression information processing method of a sending client in an instant communication process according to the first embodiment of the present disclosure may comprise the following:

Block S101 provides an expression picture in an instant communication conversation window.

An instant communication conversation window generally comprises two parts. One part is an information editing region used for receiving an inputted text and/or a selected expression picture from a user, etc. The other part is an information display region used for displaying text(s) and expression picture(s) sent by the user, as well as text(s) and expression picture(s), etc., sent from a user on the other side. The so-called expression picture provided at block S101 may be either an expression picture selected and sent by a user, or an expression picture received from the user on the other side. That is to say, a user may operate an expression picture sent from the user on the other side, an expression picture sent by himself/herself, or an expression picture that is to be sent by himself/herself.

If the expression picture is sent by the user himself/herself, the expression picture selected by the user is directly provided in the instant communication conversation window. Moreover, information related to the expression picture may be sent to the user on the other side so that a client of the user on the other side may display the expression picture in an instant communication conversation window thereof.

If an expression picture is sent from the user on the other side, the expression picture may be processed differently based on different information in the expression picture when the expression picture is provided. For example, if the client of the user on the other side directly sends an expression picture itself, the expression picture may be directly displayed in the current instant communication conversation window. If the client of the user on the other side sends identification information (such as ID and the like) related to an expression picture, a corresponding expression picture may firstly be found from a first expression database according to the identification information, and the found expression picture may then be displayed in the current instant communication conversation window.

Block S102 obtains information of a user operation activity sent from a user with respect to the expression picture.

At this block, the obtained information of the user operation activity may be various operation activities performed by the user in a terminal device, which will be described respectively as follows. If the terminal device is configured with a touchscreen, a user operation activity performed by a user may generally be a sliding operation or a clicking operation, and corresponding operation activity information may be user operation activity information outputted after the user operation is received by the touchscreen. In case of a sliding-type operation, different user operation activity information may be generated according to different positions, directions and/or trajectories of an associated sliding activity. In case of clicking-type operation, different user operation activity information may also be generated according to different positions and/or number of times of an associated clicking activity.

If the terminal device is configured with a gravity sensor, a user operation activity performed by a user may also be an operation (such as shaking a device, etc.), and corresponding operation activity information may be user operation activity information outputted after the user operation is received by the gravity sensor. In case of a shaking-type operation, different user operation activity information may be generated according to different directions and/or magnitudes of an associated with shaking activity.

If the terminal device is configured with an infrared sensor, when a user is near to the terminal device, an activity of a face or a hand of the user that is close to the terminal device may be detected by the infrared sensor. For this case, corresponding operation activity information may be user operation activity information outputted after a user operation is sensed by the infrared sensor.

It should be explained that the embodiments of the present disclosure are not limited to a touchscreen, a gravity sensor and an infrared sensor, as long as information of a user operation activity made by a user on an expression picture can be obtained. In addition, these different user operations may be combined with one another so as to generate combined user operation activity information. For example, a user may simultaneously perform one or any combination of operation activities such as sliding, clicking, shaking and approaching, etc., and user operation activity information obtained may be combined operation activity information, such as, clicking+sliding, sliding+shaking, approaching+clicking, and sliding+clicking+shaking, etc.

Block S103 searches a first expression database based on the expression picture and the obtained information of the user operation activity and generates a first response message corresponding to the expression picture under the user operation activity.

A first expression database needs to be used at this block. Corresponding relationships among expression pictures, response messages and respective operation activity information for starting the response messages are set up in the first expression database. The operation activity information in the first expression database may be defined by a user or set by a system. Moreover, one expression picture in the first expression database may correspond to one or more response messages.

The operation activity information for starting the response message is specifically used for matching with the obtained information of the user operation activity, and for generating a first response message corresponding to the expression picture under the user operation activity when the obtained information of the user operation activity of the user relating to the expression picture matches the operation activity information for starting the response message. In the embodiments of the present disclosure, as user operation activity information may vary, the matching condition is said to be met as long as the user operation activity information corresponding to the user is similar to the operation activity information for starting the response message in order to improve an interactive effect.

In a specific implementation, the operation activity information recorded in the first expression database may be operation type information. Moreover, a same expression picture may correspond to a same or different response message under different types of operation. Specifically, the operation activity information stored in the first expression database for starting the response message may further comprise information of an operation type, and the operation type comprises one or a combination of the following operations performed on the terminal device: a sliding operation type, a clicking operation type, a shaking operation type and an approaching-to-terminal operation type. Correspondingly, the corresponding relationships among the expression pictures, the response messages and the operation activity information for starting the response messages as being set up in the first expression database are as shown in Table 1:

TABLE 1

| Expression picture | Response message | Operation activity information for starting the response message |
|---|---|---|
| Portrait A | Animation X1 of Portrait A | Sliding operation type |
| Portrait A | Animation X2 of Portrait A | Clicking operation type |
| Portrait A | Animation X3 of Portrait A | Shaking operation type |
| Portrait A | Animation X4 of Portrait A | Approaching-to-terminal operation type |

In other words, when the user performs an operation on Portrait A, information specific to an operation type may be obtained when the information of the user operation activity is obtained, and a response message corresponding to the operation type may be determined by querying the foregoing Table 1 in the first expression database. For example, a corresponding response message may be determined to be an Animation X1 of Portrait A if the operation type corresponding to the currently obtained information of the user operation activity is a sliding operation type, and a corresponding response message may be determined to be an Animation X2 of Portrait A if an operation type corresponding to currently obtained information of the user operation activity is a clicking operation type, etc.

In addition, in a real application, a user operation type may further be subdivided in a finer granularity for performing a better matching with user operations. For example, if the user performs a sliding operation on an expression picture of Portrait A, corresponding response messages may be different when the user conducts the sliding operation on the expression picture A at different positions, along different directions and trajectories. Under such circumstances, if the expression picture provided in the instant communication conversation window is an expression picture of Portrait A, the corresponding relationships among the expression pictures, the response messages and the operation activity information for starting the response messages as being set in the first expression database are as shown in Table 2:

TABLE 2

| Expression picture | Response message | Operation activity information for starting the response message |
|---|---|---|
| Portrait A | Head motion animation of Portrait A | Perform an operation at the head of Portrait A |
| Portrait A | Hand motion animation of Portrait A | Perform an operation at the hand of Portrait A |
| Portrait A | Portrait A is correspondingly split horizontally or vertically, or animation is split along another angle | Slide across Portrait A horizontally, vertically or along another angle |
| Portrait A | Portrait A makes an animation of 'smiling face' | Click on Portrait A once |
| Portrait A | Portrait A makes an animation of 'loud laugh' | Click on Portrait A twice |

As a number of different types of corresponding relationships may be set up, the foregoing corresponding relationships are merely used as an example for illustration, and are not limitations. As can be seen from the corresponding relationships in Table 1, when the user performs a sliding operation on the head of Portrait A, the response message generated via the first expression database is a movement of the head of the expression picture along with the sliding. When the user performs a sliding operation on the hand of Portrait A, the response message generated via the first expression database is a movement of the hand of the expression picture along with the sliding. Or when the user performs a horizontal sliding, a vertical sliding or a sliding at another angle on the expression picture of Portrait A, corresponding response messages may be different, for example, an animation of splitting the expression picture horizontally, vertically or along the other angle, etc. Similarly, information relating to a position and/or a number of clicks associated with a clicking operation may be obtained, and different responses correspond to different specific information accordingly. For example, a certain expression picture makes a "smiling face" when the expression picture is clicked once and makes a bigger smile when the expression picture is clicked twice, etc.

It should be noted that, response messages corresponding to an identical expression picture under different operation types may be stored individually no matter how the operation types are subdivided in the mode introduced above. For example, an identical expression picture corresponds to different response messages under operation types of sliding, clicking, shaking, approaching, etc. If an identical expression picture, which corresponds to different attributes (such as positions, directions and trajectories in a sliding operation, positions and number of clicks in a clicking operation, directions and magnitudes in a shaking operation, etc.) under an identical operation type, is further needed to correspond to different response messages, the response messages corresponding to the different attributes and different combinations of attributes need to be defined respectively, as shown in Table 2, for example. This will cause the size of the expression database to become very large, which is not good for a mobile communication terminal with limited storage space. In addition, the matching degree of the user operation may be not high enough, i.e., response messages corresponding to some representative attribute values may be stored in general, and only approximate values may be adopted for other attribute values for different attributes under an identical operation type. For example, when a user performs a sliding operation at the upper position of the head in an expression picture, this may eventually be identified as an operation performed on the head only, and an animation effect displayed thereafter is the head is being split from the middle of the head instead of the position at which the user actually performs the operation, etc.

In order to solve the foregoing problems, in the embodiment of the present disclosure, corresponding operation types in the operation activity information that is stored in the first expression database may further be divided into types as described in Table 1 coarsely. However, respective response messages may also include information of calculation methods corresponding to the operation types. A calculation method may be stored by way of a formula, in which parameters may be specific attribute information under a specific operation type. In other words, in this implementation, the corresponding relationships among the expression pictures, response messages and the operation activity information for starting the response messages as set up in the first expression database may be as shown in Table 3:

TABLE 3

| Expression picture | Response message | Operation activity information for starting the response message |
|---|---|---|
| Portrait A | Animation X1 of Portrait A under calculation method Y1 for sliding operation type | Sliding operation type |

TABLE 3-continued

| Expression picture | Response message | Operation activity information for starting the response message |
|---|---|---|
| Portrait A | Animation X2 of Portrait A under calculation method Y2 for clicking operation type | Clicking operation type |
| Portrait A | Animation X3 of Portrait A under calculation method Y3 for shaking operation type | Shaking operation type |
| Portrait A | Animation X4 of Portrait A under calculation method Y4 for approaching-to-terminal operation type | Approaching-to-terminal operation type |

Through Table 3, when the information of the user operation activity is obtained, an operation type that the user performs on the expression picture may be obtained, and operational attribute values (attribute information of a sliding activity including sliding position, direction and/or trajectory information, attribute information of a clicking activity including clicking position and/or number of clicks information, and attribute information of an activity of shaking a terminal device including shaking direction and/or magnitude information, etc.) under the operation type may be also obtained. In response to obtaining the operation activity information, a calculation method in a corresponding response message may be retrieved from the first database first based on the obtained operation type. Then, attribute value(s) acquired under the operation type is/are inputted into the calculation method so as to calculate response data corresponding to the expression picture that is found under the user operation activity information. Based on the response data, a first response message that matches the information of the user operation activity is generated. In other words, in this implementation, different calculation methods corresponding to an identical expression picture under different operation types are needed to be defined in the first expression database only. For example, for a certain expression picture, a corresponding animation under a sliding operation type is to split the expression picture with a "knife". Only a picture of "knife" and a corresponding calculation method in an associated response message are needed to be defined in the first expression database. In a final response message, at which position and along which direction the expression picture is split specifically are determined based on attribute information of user operation obtained in real time and according to the calculation method. The expression picture is then split into two parts according to the position and the direction that are determined in real time. The picture of "knife" that is defined in the first expression database is combined with the split expression picture, and an animation effect is re-generated, so that the animation may be played to the user as the corresponding first response message.

For example, a user performs a sliding operation across an expression picture horizontally, vertically or at another angle. Activity information of that sliding operation activity information is matched with the corresponding expression picture. For example, a corresponding animation for splitting the expression picture in a corresponding position and direction is calculated according to a sliding position and direction. Similarly, information relating to position and/or number of clicks associated with a clicking activity, etc., may be acquired, and an animation corresponding to the expression picture is calculated according to different user operation activity information that is matched with the corresponding expression picture.

It should be explained that, in this first embodiment, the user may download part or all of the data in the first expression database to a local terminal device of the user in advance.

In addition, it should be explained that, during specific implementation, a hint message may be displayed when an expression picture is displayed, and the hint message is used for indicating that a user may conduct a user operation activity on the expression picture and information of operation methods. For example, referring to FIG. 2, after the user on the other side sends an expression picture, the hint message may be "try to slide or knock on the expression". In this way, the user may know that it is possible to perform an operation on the expression picture. After the user performs a sliding or clicking operation in an expression picture region, an instant communication client may acquire and determine information of a user operation activity that is submitted to the expression picture by the user.

Figure 2:
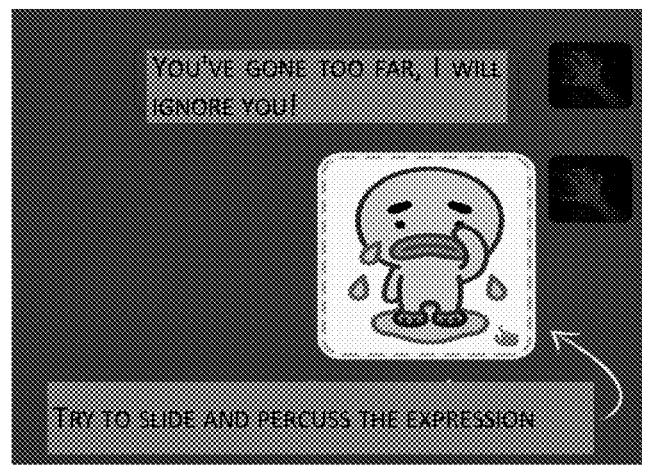
FIG. 2 is a first interface diagram according to the embodiments of the present disclosure.
Figure 3:
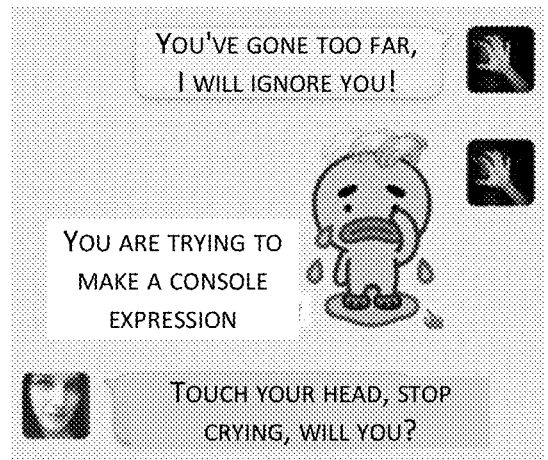
FIG. 3 is a second interface diagram according to the embodiments of the present disclosure.

Specifically, when corresponding information is provided to the user, if the response message is an audio message, the audio message may be directly played. If the response message is information, such as video, animation or picture, to be displayed, the response message related to the expression picture may be played in the instant communication conversation window at the position of the expression picture that is operated. As shown in FIG. 3, if the user performs a sliding operation on an expression picture after an expression picture as shown in FIG. 2 is sent from the other user, an effect as shown in FIG. 3 may be displayed, namely a 'hand'-shaped picture appears above the expression picture as shown in FIG. 2, and the hand-shaped picture moves from the left to the right continuously, demonstrating a fondling action. Meanwhile, a certain text message may be set up for an operation in advance. This text message may be set up in the foregoing first expression database. In other word, a corresponding relationship among an expression picture, operation activity information, a first response message and a text message may be set up in advance in the first expression database. A first text message may be displayed while a first response message is played. Generally, the text message is used for textually describing the response message corresponding to the operation activity that has been submitted by the user, such as "an expression showing that you are trying to comfort" as shown in FIG. 3, etc. In addition, first expression database may further store animation information of a prop that is to be provided for an expression picture under corresponding operation activity information. When executing the user operation activity, a prop animation may further be played for a user. For example, when the user performs a sliding operation on a cry expression picture, a "small hand" performing stroking is displayed. Or a "hammer" may be displayed when the user performs a clicking operation on a certain expression picture, and so on.

In addition, after a user performs a certain operation on a certain expression picture, music may further be played. For example, if the user on the other side sends an expression picture of a music instrument, a sliding operation may strum the music instrument, such as a guitar, an erhu and a violin, or the music instrument may be percussed when a clicking operation is performed. For example, if a user A sends a keyboard picture, a user B may click the picture to play music to enable the user B to perform music for the user A. A text prompt for the user B is: you are playing music for the other party.

It should be explained that, in a specific implementation, an identical expression picture may correspond to a plurality of response messages under identical operation activity information. In this case, a prompt message may be provided to a user to prompt the user to select and play one of a plurality of response messages. In addition, an operation activity performed to an identical expression picture by a user may be formed by a combination of a plurality of actions, and different actions may correspond to one or more response messages respectively. In this situation, a combination of response messages may further be generated from part or all of respective first response messages for playing to the user. For example, different actions correspond to one animation respectively, and the animations may be combined for playing continuously.

Moreover, it should be explained that, for a first response message, when the first response message is audio, video and animation information, as the information is information having a continuity property of playing on a time dimension, and a sliding operation or shaking operation performed by the user is also a process and has a certain continuity in terms of time, a time duration associated with the continuity of the operation activity may be embodied. Therefore, in the embodiment of the present disclosure, if a sliding operation (which may be a sliding operation or a combination of a plurality of sliding operations) or a shaking operation, for example, that is performed on an expression picture by a user is detected, a starting time point and an end time point of an associated user operation activity may be acquired, and a time duration of the user operation activity may be calculated based on the starting time point and the end time point. As such, a first response message may be played to the user according to the time duration of the user operation activity. In other words, if the time duration of the user operation activity is longer, the time for playing the first response message is longer. If the time duration of the user operation activity is shorter, the time for playing the first response message is shorter. Specifically, a response message may be an animation which comprises a plurality of continuous picture frames, namely, a string of picture collection, for example, and a display time interval between adjacent picture frames has been set up in advance. After a sliding operation is detected and a time duration of an user operation activity is acquired, the time duration of the user operation activity may be compared with a total time duration of the animation first. If the former is less than the latter, a frame where the animation is to be ended may be determined based on the time duration of the user operation activity and the display time interval between adjacent picture frames. Then when the animation is played in an instant communication conversation window, playing may be ended at this frame. If the time duration of the user operation activity is greater than or equal to the total time duration of the animation, the animation may be played in the instant communication conversation window until the animation is finished.

For example, a certain animation is a collection made up of ①, ②, ③, ④ and ⑤ pictures, the play of the animation from ① to ⑤ takes 0.5 second, and animation between pictures is 0.1 second. When a user stops sliding after a single sliding operation and if the time consumed is 0.3 second, the animation is stopped at ③, and an animation is maintained at a ③ state. After a certain time, if the user continues sliding, the following animation is continued till the animation is ended. The animation may be repeated according to expression requirements. In addition, once the user stops, text, prop animations, prompts and animation content may not be provided any more, and transmission is performed. Similarly, if the first response message is an audio file, a time duration of playing the audio file is the same as the method for the animation. When the user stops sliding, the playback of the audio file is ended.

S104 sends found information relating to the expression picture and the obtained information of the user operation activity to a receiving client corresponding to a receiving user to facilitate the receiving client to generate a second response message corresponding to the expression picture under the user operation activity.

For a sending client, after the sending client generates a first response message, the sending client may send information relating to the expression picture and obtained information of user operation activity to a receiving client corresponding to a receiving user. As such, the receiving client may generate a second response message corresponding to the expression picture under the user operation activity. The receiving user may generate a second interactive response message corresponding to the second response message and play the second interactive response message. The sending client may either send interactive operation information to the receiving client via a relay server, or directly via a peer-to-peer mode, etc., to the receiving client.

It should be explained that, in a specific implementation, if the user operation activity is a combined operation comprising a plurality of actions, the expression picture information and the obtained information of the user operation activity may be sent to the receiving party client corresponding to the receiving user after an action is detected. Alternatively, in another implementation, in order to enable the second response message played by the receiving party client to be smoother, after the combined operation comprising a plurality of actions is detected, expression picture information and information of a user operation activity corresponding to each action may be sent to the receiving party client corresponding to the receiving user. In this implementation, as compared with the sending client, the receiving client may experience certain delay when playing a response message.

For the receiving client, after information relating to an expression picture and information of a user operation activity is received, the receiving client may generate a second response message and a play mode, as similar to the sending client. An implementation process for the receiving client will be introduced in detail hereinafter using a second embodiment.

Second Embodiment

Figure 4:
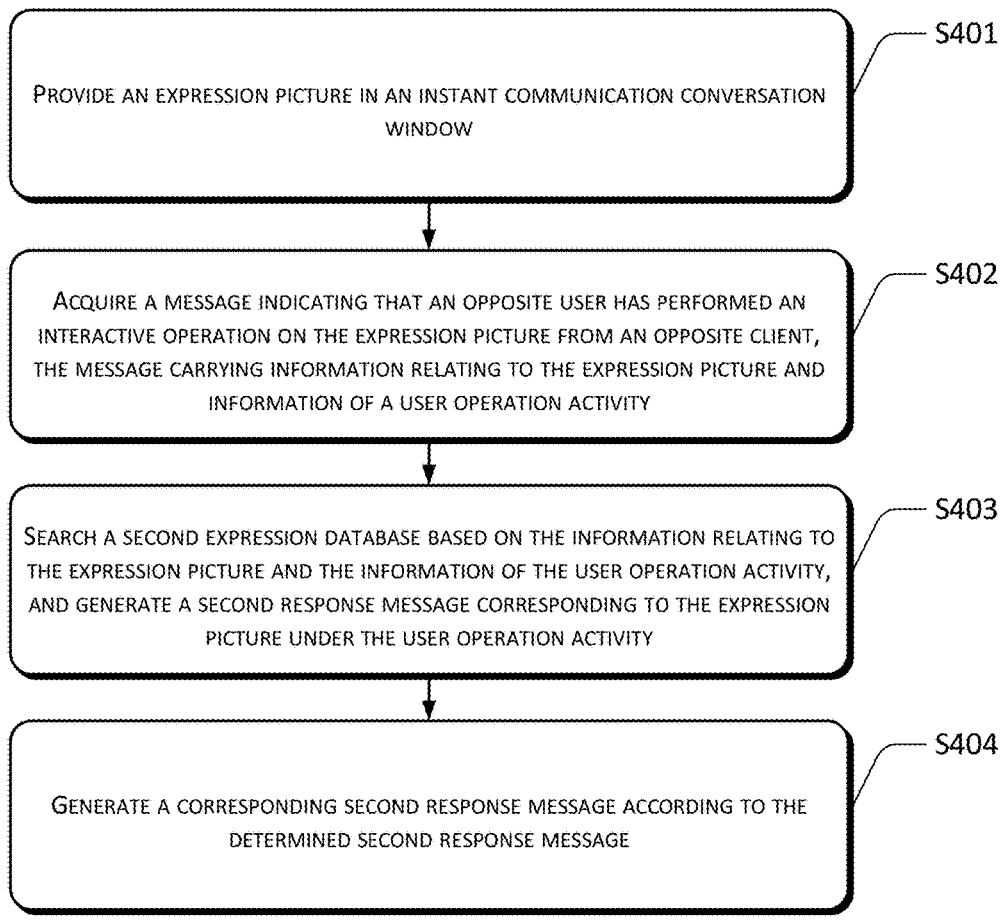
FIG. 4 is a flow chart of a second method according to the embodiments of the present disclosure.

Referring to FIG. 4, the second embodiment is an implementation of a receiving client corresponding to the first embodiment, and an expression information processing method for a receiving client in an instant communication process in accordance with the second embodiment may comprise the following:

S401 provides an expression picture in an instant communication conversation window.

S402 acquires a message indicating that an opposite user has performed an interactive operation on the expression picture from an opposite client, the message carrying information relating to the expression picture and information of a user operation activity.

S403 searches a second expression database based on the information relating to the expression picture and the information of the user operation activity, and generates a second response message corresponding to the expression picture under the user operation activity.

As information received includes the information relating to the expression picture and the information of the user operation activity, what kind of operation activity has been performed on which expression picture by a sending user is known. Meanwhile, the receiving client may also download a second expression database into a local terminal device in advance. The second expression database is configured with expression pictures, response messages and respective operation activity information for starting the response messages. In this way, after knowing what kind of operation activity has been performed on which expression picture by the sending user, a corresponding second response message may be determined by querying the second expression database. The second response message herein may also comprise an audio, a video, an animation, a picture and the like, that is related to the expression picture. Furthermore, the second response message may be also generated by matching with the user's operation activity information in real time. In other words, after the user performs a certain operation on a certain expression picture, information of the user's operation activity may further be matched with animation. The received user operation activity information is matched with a corresponding expression picture if the second response message retrieved is the user operation activity information matched with the animation. For example, if the user operation activity information received is a sliding position or direction, a corresponding animation of a corresponding expression picture split at a corresponding position and direction is calculated, etc. Related animation, for example, clicking corresponding to the expression picture, is calculated according to the user operation activity information received if the user operation activity information received is information relating to position and/or number of clicks of a clicking activity.

S404 generates a corresponding second response message according to the determined second response message.

After the corresponding second interactive response message is generated, the receiving client may play the second response message. During playback, if the second response message is an animation, a video or a picture related to the expression picture, the animation, the video or the picture that is related to the expression picture may also be displayed at a position where the expression picture is located in the instant communication conversation window. This is equivalent to refreshing the presentation of the information display region in the instant communication conversation window. In addition, the second response message may alternatively be an animation, an audio or a video and the like having a certain playback time duration. Therefore, when the sending user performs a sliding operation, the sending client may also send time duration information related to the sliding operation to the receiving client. In this way, the receiving client may play the second response message for the associated user according to the time duration of the sliding operation.

In addition, the receiving client may also acquire second text information corresponding to the user operation activity related to the expression picture that is operated, and display the second text information in the information display region. In other words, after watching the operated animation or hearing a corresponding audio, the receiving user may also see the text information corresponding thereto in the information display region, which is used for explaining an operation being performed by the opposite user, for example, "an expression that the other party is trying to console you", "an expression that the other party is beating you", etc.

It should be explained that, for an identical expression picture and a same user operation activity, a first response message of the sending client may or may not be the same as a second response message of the receiving client. Users may select corresponding response messages according to their preference, for example, different expression pictures, animations or matching methods, etc. Correspondingly, the first response message of the sending client may or may not be the same as the second response message of the receiving client. Moreover, it should be noted that the second embodiment and the first embodiment are corresponding to each other, with differences merely in terms of description perspective. In particular, with respect to playing related content such as response messages, the first embodiment can be referenced and details are not redundantly repeated herein.

Third Embodiment

In the above first embodiment and second embodiment, a precondition is that an expression database has been downloaded into a local terminal device. However, in specific implementation, a response message generally is an animation or an audio, etc., and thus occupies a considerable amount of storage resources of the terminal device. Thus, in order to reduce the occupancy of the resources of the terminal, the expression database may be stored in a server side instead of being downloaded into the local terminal device. So, when a client user performs an interactive operation on a certain expression picture, an associated sending client may upload information related to the expression picture and user operation activity information to the server, and the server determines a first response message and a second response message based on the expression database, which are then sent to the sending client and a receiving client. The details of a specific implementation is described herein as follows.

Figure 5:
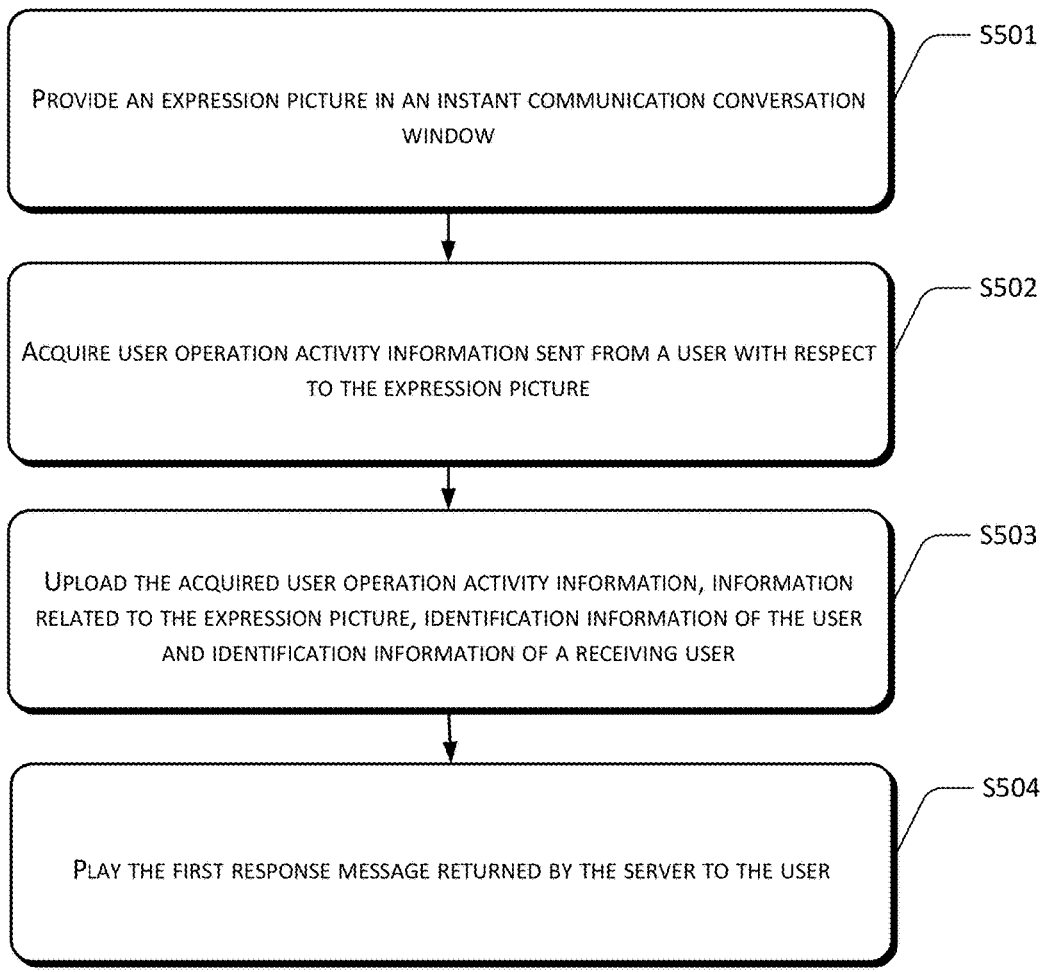
FIG. 5 is a flow chart of a third method according to the embodiments of the present disclosure.

Referring to FIG. 5, the third embodiment of the present disclosure provides another expression information processing method for a sending client in an instant communication process. The method includes the following:

S501 provides an expression picture in an instant communication conversation window.

S502 obtains user operation activity information sent from a user with respect to the expression picture.

S501 and S502 are the same as S101 and S102 in the first embodiment.

S503 uploads the acquired user operation activity information, information related to the expression picture, identification information of the user and identification information of a receiving user to a server so that the server searches the third expression database according to the obtained user operation activity information, generates a first response message and a second response message corresponding to the expression picture that are due to the user operation activity, returns the first response message to a sending client corresponding the a user, and sends the second response message to a receiving client corresponding to the receiving user.

Since the expression database is not stored in the local terminal device, information of user operation activity related to an expression picture sent from a user may be immediately uploaded to a server upon obtaining it from the user. Specific user operation activity information is the same as that in the first embodiment. Therefore, when the server determines a specific first response message, it is the same as S103 in the first embodiment. And, when the server determines a specific second response message, it is the same as S403 in the first embodiment. A difference lies in entities that perform the execution. The server only needs to make determination once if the first response message is the same as the second response message. After the first response message and the second response message are determined, the first response message may be returned to the sending client, and the second response message may be sent to the receiving client.

S504 plays the first response message returned by the server for to user.

After receiving the first response message returned from the server, the sending client may generate and play a first interactive response message for the user. Correspondingly, after receiving the second response message sent from the server, the receiving client may generate and play a second interactive response message for the receiving user.

Specific forms of response messages and implementation details of the playback process for the users are the same as those of the first embodiment and the second embodiment. Thus, the descriptions of the first embodiment and the second embodiment may be referenced with, and are not redundantly repeated herein.

In short, interaction between a user and an expression is introduced in the foregoing first to third embodiments. Through these methods, it is equivalent to an expression picture being able to respond to an interactive operation of a user so that the expression picture sent by the user may express the feelings of the user in a better manner, and a simulation degree of an instant communication tool with respect to real-world users may also be improved.

For example, a user A initiates an expression of crying. If a user B performs a sliding operation on the expression, an animation acting like a hand placating appears on top of the expression, and a text interface B indicates that: you are trying to comfort the expression. A text interface A indicates that: the other party is trying to comfort your expression. During the comforting process of the expression, an animation may change based on design, and a terminal device of the user A may be shaken. If the user B clicks on an expression using a finger, an animation showing a prop of a "hammer" may appear on the expression, with a text prompt indicating that: you are beating the expression. The expression changes from crying lightly to more heavily. Similarly, the user A may also see a text prompt indicating that: the other party is beating your expression.

For another example, a user A sends a keyboard expression picture, on which a user B may click to play a music, just like the user B is playing the music for the user A. A text prompt for the user B is that: you are playing music for the other party. A text prompt for the user A is that: the other party is playing music for you.

In addition, a user may also perform an interactive operation on an expression picture sent by the user himself/ herself. For example, a user A sends an expression picture of crying, and performs a sliding operation on the expression picture thereafter. Tears in a response picture then become less. And, an animation or a picture displays crying more heavily if the user A clicks on the expression picture.

Fourth Embodiment

The fourth embodiment describes an interaction between expression and expression/text in more detail.

Figure 6:
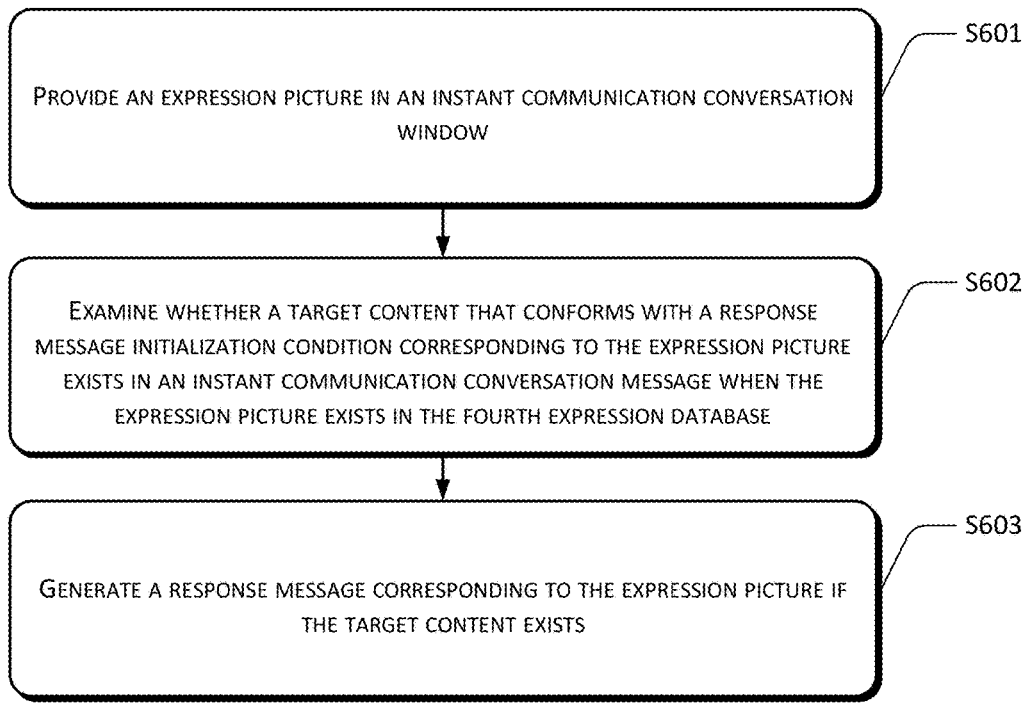
FIG. 6 is a flow chart of a fourth method according to the embodiments of the present disclosure.

First of all, in the fourth embodiment, a fourth expression database is needed to be downloaded to a local terminal device of a user in advance. The fourth expression database is configured with corresponding relationships among expression pictures, response messages and respective conditions for starting the response messages. Referring to FIG. 6, an expression information processing method in an instant communication process in accordance with the fourth embodiment of the present disclosure may comprise the following:

S601 provides an expression picture in an instant communication conversation window.

S601 is similar to S101 of the first embodiment, and the expression picture may be either sent by a user or by a user on the other side.

S602 examines whether a target content that conforms with a response message initialization condition corresponding to the expression picture exists in an instant communication conversation message when the expression picture exists in the fourth expression database.

In response to determining which expression picture is provided in the window, a determination is also made as to whether a target content that is in conformity with a response message initialization condition corresponding to the expression picture exists in an instant communication conversation message. An instant communication conversation messages may be a message (a current chatting record, etc.), a chat history, etc., in the current instant communication conversation window between users. In a specific implementation, the fourth expression database records which expression pictures possess a response message and what response messages correspond thereto. Therefore, whether to possess a response message may be determined by querying the fourth expression database. For example, animations, audios or videos such as stones, knives, arrows, an elephant spraying water, lions, missile launching, slippers, a woman shouting abuses in the street, etc., may appear in the fourth expression database and be associated with other expression pictures or texts, and are configured with corresponding response messages in advance, for example, some animations or a certain piece of music, etc.

In order to avoid occupancy of system resources by overwhelming determination information and influencing user experience, in the embodiments of the present disclosure, when determining whether a target content that is in conformity with the response message initialization condition corresponding to the expression picture exists in the instant communication conversation message, a determination as to whether a target content that is in conformity with the response message initialization condition corresponding to the expression picture exists in the instant communication conversation window may be made only. In specific description of the following blocks, an example of determining whether a target content that is in conformity with a response message initialization condition corresponding to an expression picture exists in an instant communication conversation window is used for illustration only.

S603 generates a response message corresponding to the expression picture at a position where the target content is located if the target content exists.

In response to determining the response message, the response message may be played to the user. The response message may be an animation related to the expression picture. Upon determining the target content that is related to the expression picture, the response message corresponding to the expression picture may be played at a location of the target content. As a related animation is generally an action such as shooting an arrow, throwing a stone, etc., displaying the related animation at the location of the target content actually means applying the related animation on the target content.

In a specific implementation, the condition for starting the response message corresponding to the first expression picture stored in the fourth expression database may comprise: displaying a second expression picture associated with the first expression picture in the instant communication conversation window. For example, in a specific implementation corresponding relationships among expression pictures, response messages and respective conditions for starting the response messages as set up in the fourth expression database may be what is shown in Table 4:

TABLE 4

| Expression picture | Response message | Response message starting condition |
| --- | --- | --- |
| Arrow | Animation X1 | Displaying an expression picture of "show-off" in an instant communication conversation window |
| Arrow | Animation X2 | Displaying an expression picture of "flaunt" in an instant communication conversation window |
| Arrow | Animation X3 | Displaying an expression picture of "snicker" in an instant communication conversation window |
| Arrow | Animation X4 | Displaying an expression picture of "disdain" in an instant communication conversation window |

Figures 1, 7:
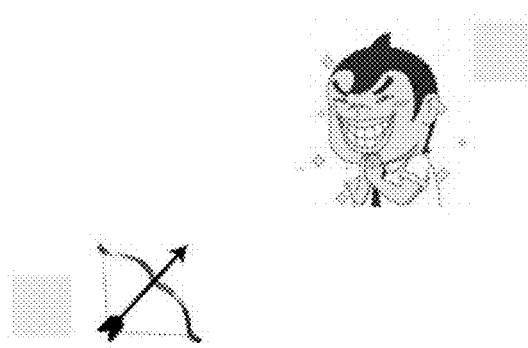
Figures 2, 7:
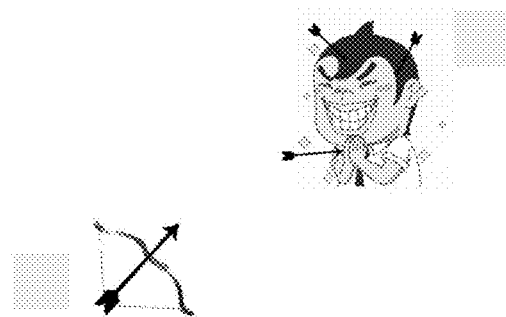

In this way, a determination may be made as to whether a second expression picture associated with the first expression picture exists in the instant communication conversation window. If affirmative, a determination is made that a target content that is in conformity with the response message starting condition corresponding to the expression picture exists in the instant communication conversation window. For example, as shown in FIG. 7-1, if an expression picture indicating "show-off" has previously displayed in the information display region and the user sends a picture of "arrow" thereafter, the client determines that the expression picture of "show-off" is associated with the expression picture of "arrow", and the corresponding response message is animation X1, i.e., the arrow shoots at the expression picture of "show-off". Therefore, an effect as shown in FIG. 7-2 may be displayed in the information display region.

Alternatively, a condition for starting a response message corresponding to a certain expression picture stored in the fourth expression database may also comprise: an instant communication conversation window displaying a text associated with the expression picture. For example, in a specific implementation, corresponding relationships among expression pictures, response messages and respective conditions for starting the response messages as set up in the fourth expression database may be as shown in Table 5:

TABLE 5

| Expression picture | Response message | Response message starting condition |
| --- | --- | --- |
| Arrow | Animation X1 | Displaying text of "I'm so handsome" in an instant communication conversation window |
| Arrow | Animation X2 | Displaying text of "I'm so beautiful" in an instant communication conversation window |

TABLE 5-continued

| Expression picture | Response message | Response message starting condition |
| --- | --- | --- |
| Arrow | Animation X3 | Displaying text of "I'm so cool" in an instant communication conversation window |

Figures 1, 8:
Figures 2, 8:

Thus, if the instant communication conversation window does not display another expression picture associated with the expression picture, text content displayed in the instant communication conversation window may be analyzed, determining whether a target text associated with the expression picture exists. If exists, a target content that is in conformity with the response message starting condition corresponding to the expression picture is determined as existing in the instant communication conversation window. As shown in FIG. 8-1, if the user on the other side has previously sent an expression picture of "haha, I am so handsome", after the user sends an expression picture of shooting an arrow, the sentence sent by the user on the other side and a head portrait thereof may be determined as the target content of the response message, i.e., shooting the arrow at this sentence and the head portrait, as shown in FIG. 8-2.

In a specific implementation, the matching of the response message is initiated by the instant communication client or the server for the expression picture of the user. Therefore, before the response message is played, a prompt message may be sent first. The prompt message is used for inquiring the user whether to play the response message, which will be played to the user when the user select to play so as to avoid the user's disgust.

In addition, if a certain expression picture is displayed in the instant communication conversation window, a plurality of communication contents may have been displayed in the instant communication conversation window. Therefore, there exist multiple target contents that are in conformity with the response message starting condition corresponding to the expression picture in the instant communication conversation window. Under such circumstances, and the target contents may be provided to the user for selection. If the user selects certain communication content therefrom, that communication content is determined as finally matched target content.

Moreover, as mentioned above, in case when a certain expression picture is displayed in the instant communication conversation window, a plurality of communication contents may have been displayed in the instant communication conversation window. However, in a specific implementation, it is possible to detect whether a target content that is in conformity with the response message starting condition corresponding to the expression picture exists in a preset number of displayed contents before or after the expression picture in the instant communication conversation window. For example, detection is made as to whether target content in conformity with the response message starting condition corresponding to the expression picture exists among previous N or posterior M number of messages with respect to the expression picture in the instant communication conversation window, where N may or may not be equal to M. More specifically, detection is only made whether the displayed content immediately before the expression picture in the instant communication conversation window is in conformity with the response message starting condition corresponding to the expression picture. This may reduce the workload of detection, and be more aligned with actual needs.

It should be explained that the response message is generally displayed after the expression picture sent by the user is displayed in the instant communication conversation window. Therefore, in a specific implementation, a transparent floating layer may be created at the upper layer of the instant communication conversation window, and the animation related to the expression picture is played in the transparent floating layer. In this way, it may be possible to avoid obscuring other content in the information display region by the display of the animation.

Moreover, it should be explained that in the fourth embodiment, operations of different blocks may be completed either by a client or a server. In other words, the fourth expression database may be either downloaded in advance into a local terminal device where the client is located, or stored in the server. Moreover, after the user sends an expression picture, the sending client may determine whether content associated with the expression picture is displayed in the instant communication conversation window, and submits a response if exists. The receiving client may also determine whether content associated with the expression picture is displayed in the instant communication conversation window after receiving the expression picture sent by the other party, and submits a response if exists. In other words, no matter for the sending client or for the receiving client, follow-up processing may be the same if an expression picture is provided in the instant communication conversation window, and therefore is not described individually from the perspective of a certain end herein.

In short, through interactions between expressions, expressions are no longer mutually independent but are mutually associated. One expression picture may act on another expression picture so as to get closer to interaction between real-world users, thus ensuring a higher simulation degree of the real world.

Fifth Embodiment

All the foregoing embodiments describe interaction between a user and an expression or interaction between an expression and an expression/text. In the fifth embodiment, corresponding an expression picture may also be initiated by a text. Introduction will be made in detail hereinafter.

Figure 9:
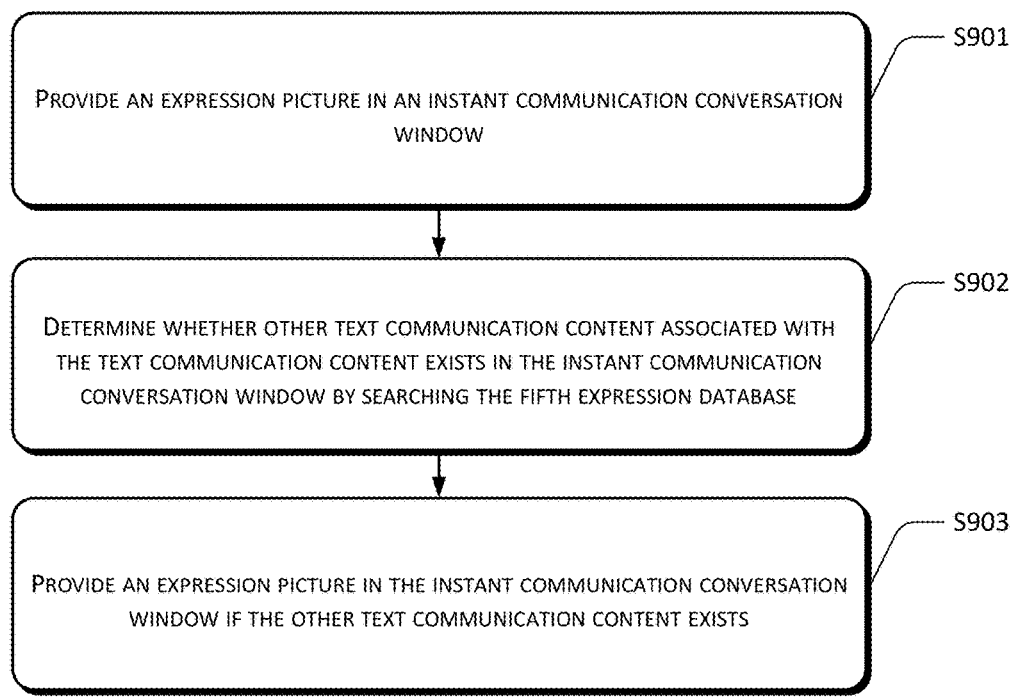
FIG. 9 is a flow chart of a fifth method according to the embodiments of the application.

Referring to FIG. 9, the fifth embodiment provides an expression information processing method in an instant communication process, which needs to set up association relationships among text communication contents in a fifth expression database, and expression pictures corresponding to correlated text communication contents in advance. Specifically, the method may comprise the following:

S901 provides a text communication content in an instant communication conversation window.

The text communication content may be either a sentence sent by a user or a sentence sent by a user on the other side.

S902 determines whether other text communication content associated with the text communication content exists in the instant communication conversation window by searching the fifth expression database.

S903 provides a corresponding expression picture in the instant communication conversation window if the other text communication content exists.

In other words, in the fifth embodiment, although the user does not initiate to send an expression picture, the client or the server may match related expression pictures according to communication content of the user and display the text communication content in the instant communication conversation window. In a real application, starting condition for the expression picture may further be defined in a fifth expression database, i.e., a corresponding expression picture is displayed when associated text communication content is displayed in the instant communication conversation window and a certain starting condition is met. For example, a user successively sends "haha" for three times, and an expression picture of "loud laugh" may be automatically displayed in the instant communication conversation window. From the perspective of technological implementations, an association relationship between "haha" and "haha" may be defined in the fifth expression database in advance, and a starting condition for the corresponding expression picture is set as appearance for three times successively. In this way, in response to detecting the existence of the associated text communication content, a determination is made as to whether the associated text communication content has appeared for three times. If affirmative, the related expression picture is started. Otherwise, corresponding expression picture is not started.

Further, as the instant communication conversation window may include multiple communication contents, in order to avoid examining too many contents and thus cause occupancy of system resources and interference with messages inputted by the user, a determination may be made as to whether other text communication content associated with the text communication content exists in a preset number of messages before or after the text communication content in the instant communication conversation window. Specifically, a determination is made as to whether other text communication content associated with the text communication content exists in previous N or posterior M number of messages associated with the text communication content in the instant communication conversation window. N may or may not be equal to M. In an embodiment, N is equal to one, and/or M is equal to one.

It should be explained that in the fifth embodiment, operations in different blocks may be completed by a client or a server. In other words, the fifth expression database may be either downloaded in advance into a local terminal device where the client is located, or stored in the server. Moreover, after the user sends a text communication content, the sending client may determine whether content associated with the text communication content is displayed in the instant communication conversation window, and submits a response if exists. The receiving client may also determine whether content associated with the text communication content is displayed in the instant communication conversation window after receiving the text communication content sent by the other party, and submits a response if exists. In other words, no matter for the sending client or for the receiving client, follow-up processing may be the same if a text communication content is provided in the instant communication conversation window, and therefore is not described individually from the perspective of a certain end herein.

In conclusion, through the fifth embodiment, an expression picture may be started through an association relationship among text communication contents, thus improving the utilization rate of the expression picture and automatically helping a user to express his/her feelings more relevantly and more intuitively without being unaware of using expression pictures to express his/her feelings.

Figure 10:
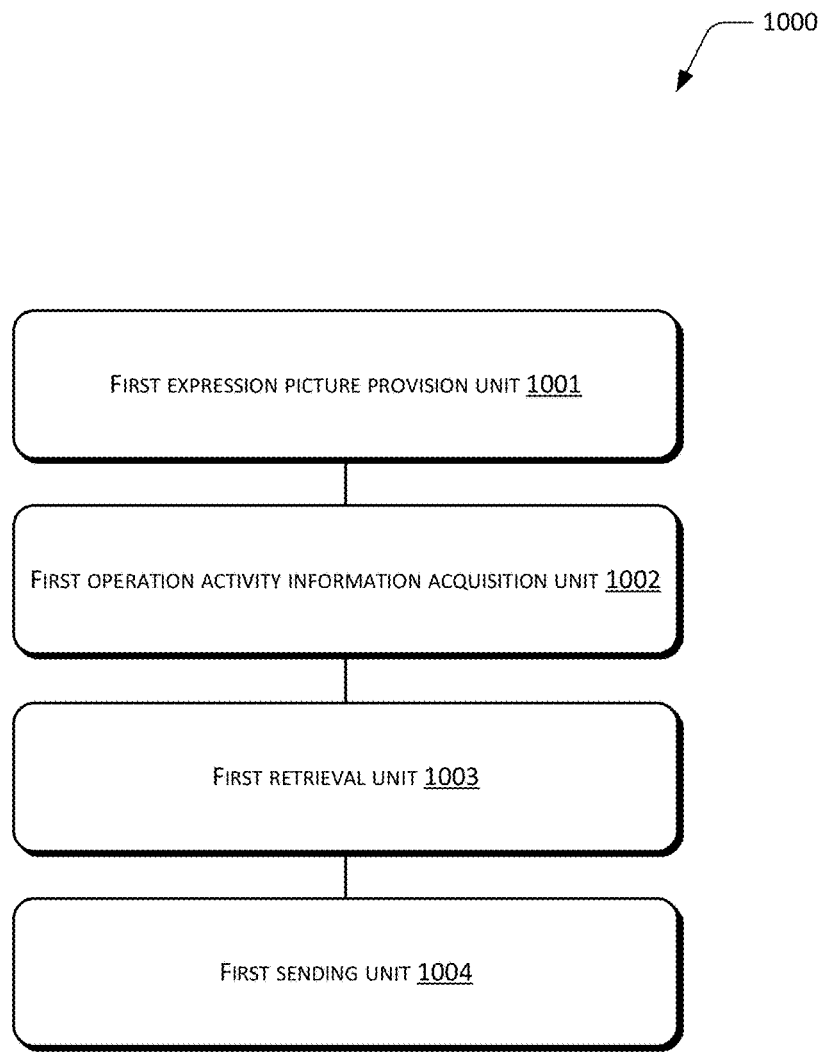
FIG. 10 is a schematic diagram of a first apparatus according to the embodiments of the present disclosure.

Corresponding to the expression information processing method for a sending client in an instant communication process according to the first embodiment of the present disclosure, the present disclosure also provides an expression information processing apparatus 1000 for a sending client in an instant communication process, wherein expression pictures, response messages and respective operation activity information for starting the response messages have been set up in a first expression database in advance. Referring to FIG. 10, the apparatus comprises:

a first expression picture provision unit 1001 used for providing an expression picture in an instant communication conversation window;

a first operation activity information acquisition unit 1002 used for obtaining information of a user operation activity sent from a user with respect to the expression picture;

a first retrieval unit 1003 used for searching the first expression database based on the expression picture and the obtained information of the user operation activity and generating a first response message that is found to be corresponding to the expression picture under the user operation activity; and a first sending unit 1004 used for sending the found message relating to the expression picture and the obtained information of the user operation activity to a receiving client corresponding to a receiving user to facilitate the receiving client to generate a second response message corresponding to the expression picture under the user operation activity.

The operation activity information that is used for starting the response messages and stored in the first expression database may further comprise information of an operation type. The operation type comprises one or a combination of the following operations performed on a terminal device: a sliding operation type, a clicking operation type, a shaking operation type and an approaching-to-terminal operation type.

A response message stored in the first expression database comprises calculation method information corresponding to the operation type, and the first retrieval unit 1003 specifically comprises:

a calculation method information acquisition subunit used for determining a type of operation performed on the expression picture by the user, and acquiring the calculation method information corresponding to the operation type;

a calculation subunit used for calculating, according to the calculation method information corresponding to the determined operation type relating to the user operation activity information, response data corresponding to the expression picture under the user operation activity information; and a response message generation subunit used for generating, according to the response data, the first response message that matches with the user operation activity information.

The calculation method is determined according to the specified operation type and operational attribute information parameters corresponding to the operation type.

The first operation activity information acquisition unit 1002 is specifically used for:

acquiring the information of the operation type relating to the expression picture performed by the user and the operational attribute information corresponding to the operation type.

The calculation subunit is specifically used for:

determining the calculation method according to the obtained operation type information and the obtained attribute information corresponding to the operation type; and calculating, according to the determined calculation method, the response data corresponding to the expression picture under the user operation activity information.

The first response message comprises information having a continuity of playing in a time dimension.

The apparatus further comprises:

a time point acquisition unit used for acquiring a starting time point and an end time point of the user operation activity;

a time duration calculation unit used for calculating a time duration of the user operation activity according to the starting time point and the end time point; and a playing unit used for playing the first response message in the instant communication conversation window according to the time duration of the user operation activity.

The information having the continuity of playing in the time dimension comprises an animation, the animation comprising a plurality of successive image frames, and a display time interval being preset between adjacent image frames, and the playing unit comprises:

a comparison subunit used for comparing a time duration of the user operation activity with a total duration of the animation;

an end frame determination subunit used for determining an end frame that is to be played according to the time duration of the user operation activity and the display time interval between the adjacent image frames when the time duration of the user operation activity is less than the total duration of the animation; and a playing subunit used for playing the animation in the instant communication conversation window until the end frame is played.

In addition, the playing subunit may also be used for:

playing the animation in the instant communication conversation window until the animation is finished playing when the time duration of the user operation activity is greater than or equal to the total duration of the animation.

When multiple pieces of information of the user operation activity of the user for the expression picture are obtained, and correspondingly multiple first response messages are found from the first expression database, the apparatus further comprises:

a combination unit used for generating a combined first response message using part or all of the multiple first response messages.

The sending unit 1004 is specifically used for:

sending found information relating to the expression picture and part or all of the obtained information of the user operation activity to a receiving client corresponding to a receiving user to facilitate the receiving client to generate a second response message corresponding to the expression picture under the part or all of the user operation activity.

If multiple first response messages are found to correspond to the expression picture under the user operation activity, the apparatus further comprises:

a first prompt unit used for providing a prompt message, the prompt message being used for prompting the user to select one from the multiple first response messages.

The apparatus further comprises:

a second prompt unit used for displaying a prompt message after the expression picture is provided in the instant communication conversation window, the prompt message being used for indicating to the user a capability of performing an operation on the expression picture and operating mode information corresponding to the expression picture.

Figure 11:
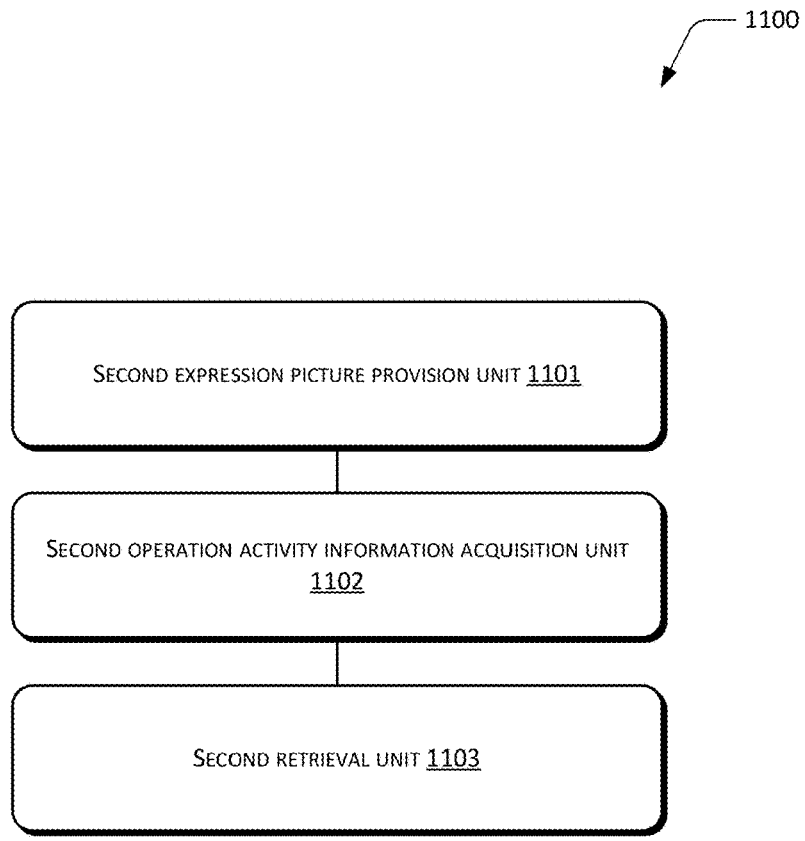
FIG. 11 is a schematic diagram of a second apparatus according to the embodiments of the present disclosure.

Corresponding to the expression information processing method for a receiving client in an instant communication process according to the second embodiment of the present disclosure, the present disclosure also provides an expression information processing apparatus 1100 for a receiving client in an instant communication process, wherein expression pictures, response messages and respective operation activity information for starting the response messages have been set up in a second expression database in advance. Referring to FIG. 11, the apparatus comprises:

a second expression picture provision unit 1101 used for providing an expression picture in an instant communication conversation window;

a second operation activity information acquisition unit 1102 used for obtaining a message indicating that an opposite user has operated on the expression picture from an opposite client, the message including information relating to the expression picture and information of user operation activity; and a second retrieval unit 1103 used for searching the second expression database based on the information relating to the expression picture and the user operation activity information, and generating a second response message corresponding to the expression picture under the user operation activity.

Figure 12:
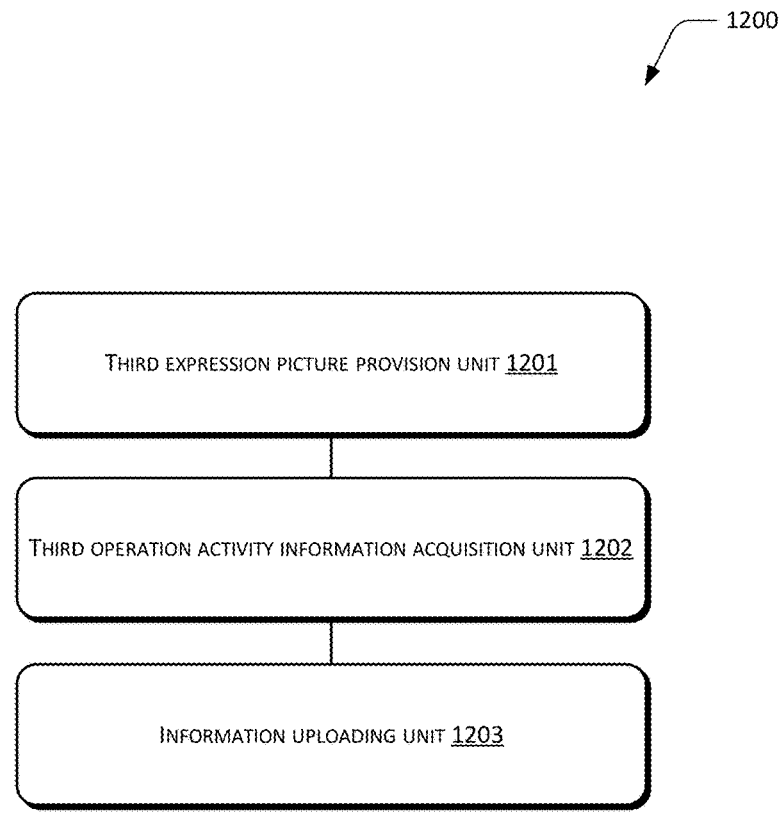
FIG. 12 is a schematic diagram of a third apparatus according to the embodiments of the present disclosure.

Corresponding to the expression information processing method for a sending client in an instant communication process according to the third embodiment of the present disclosure, the present disclosure also provides an expression information processing apparatus 1200 for a sending client in an instant communication process, wherein a third expression database is set up in a server side in advance, and the third expression database stores expression pictures, response messages and operation activity information for starting the response messages. Referring to FIG. 12, the apparatus comprises:

a third expression picture provision unit 1201 used for providing an expression picture in an instant communication conversation window;

a third operation activity information acquisition unit 1202 used for obtaining information of a user operation activity sent from a user with respect to the expression picture; and an information uploading unit 1203 used for uploading the acquired information of the user operation activity, information relating to the expression picture, identification information of the user and identification information of a receiving user to a server to facilitate the server search the third expression database based on the acquired information of the user operation activity to generate a first response message and a second response message corresponding to the expression picture under the user operation activity, return the first response message to a sending client corresponding to the user, and send the second response message to a receiving client corresponding to the receiving user.

Using the foregoing apparatuses, after a user performs an operation on an expression picture, a corresponding response message may be determined and played, which is therefore equivalent to the expression picture being responsive to the user operation such that the expression picture sent by the user may express the feelings of the user in a better manner, and a degree of simulating a real world user by an instant communication tool may also be improved.

Figure 13:
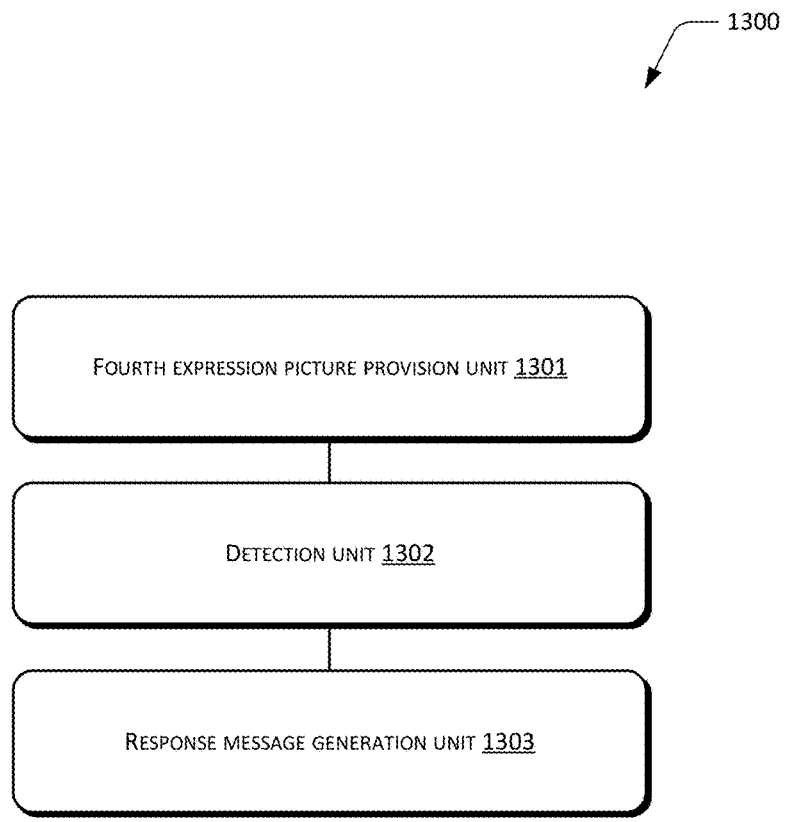
FIG. 13 is a schematic diagram of a fourth apparatus according to the embodiments of the present disclosure.

Corresponding to the expression information processing method in an instant communication process according to the fourth embodiment of the present disclosure, the present disclosure also provides an expression information processing apparatus in an instant communication process, wherein corresponding relationships among expression pictures, response messages and conditions for starting the response messages have been set up in a fourth expression database in advance. Referring to FIG. 13, the apparatus comprises:

a fourth expression picture provision unit 1301 used for providing an expression picture in an instant communication conversation window;

a detection unit 1302 used for examining whether a target content in conformity with a response message initialization condition corresponding to the expression picture exists in an instant communication conversation message if the expression picture exists in the fourth expression database; and a response message generation unit 1303 used for generating a response message corresponding to the expression picture if affirmative.

An instant communication conversation message is a message in the instant communication conversation window. The condition for starting a response message corresponding to a first expression picture stored in the fourth expression database comprises: the instant communication conversation window comprising a second expression picture associated with the first expression picture; the detection unit 1302 is specifically used for:

detecting whether a second expression picture associated with the first expression picture exists in the instant communication conversation window, and if affirmative, determining that a target content that is in conformity with the condition for starting the response message corresponding to the expression picture exists in the instant communication conversation window.

Alternatively, a condition for starting a response message corresponding to a certain expression picture stored in the fourth expression database comprises: an instant communication conversation window comprising a text associated with the expression picture, and the detection unit 1302 is specifically used for:

analyzing text contents displayed in the instant communication conversation window, determining whether a target text associated with the expression picture exists, and if exists, determining that a target content in conformity with the condition for starting the response message corresponding to the expression picture exists in the instant communication conversation window.

In addition, the apparatus further comprises:

a third prompt unit used for providing target contents or response messages corresponding to the target contents to the user for selection if the target contents in conformity with the response message starting condition corresponding to the expression picture in the instant communication conversation window are plural.

Specifically, in order to reduce workload, the detection unit 1302 is used for:

determining whether the target content in conformity with the response message starting condition corresponding to the expression picture exists in a preset number of messages before or after the expression picture in the instant communication conversation window.

More specifically, a determination is made as to whether the target content in conformity with the response message starting condition corresponding to the expression picture exists in a previous or a posterior message of the expression picture in the instant communication conversation window.

By means of the foregoing apparatuses, a determination may be made as to whether a response message has been set up for an expression picture after the expression picture is sent by a user. If exists, the expression picture may be played, thus realizing interaction between expressions or between an expressions and a text.

Figure 14:
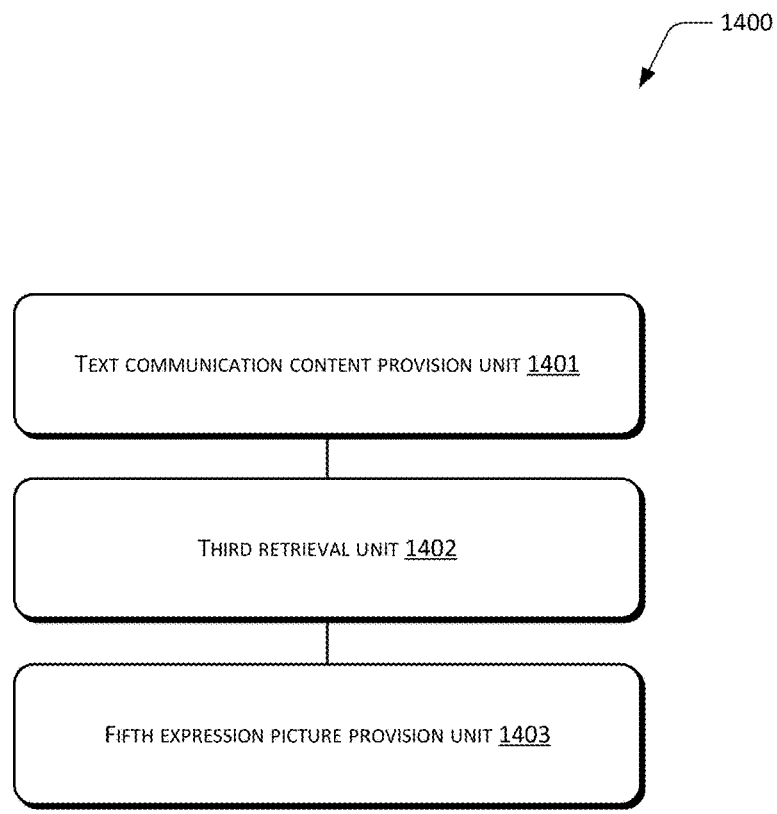
FIG. 14 is a schematic diagram of a fifth apparatus according to the embodiments of the present disclosure.

Corresponding to the expression information processing method in an instant communication process according to the fifth embodiment of the present disclosure, the present disclosure also provides an expression information processing apparatus in an instant communication process, wherein an association relationship between text communication contents has been set up in a fifth expression database in advance, and expression pictures corresponding to mutually associated text communication contents. Referring to FIG. 14, the apparatus comprises:

a text communication content provision unit 1401 used for providing a text communication content in the instant communication conversation window;

a third retrieval unit 1402 used for determining whether other text communication contents that are associated with the text communication content exist in the instant communication conversation window by examining the fifth expression database; and a fifth expression picture provision unit 1403 used for providing corresponding expression pictures in the instant communication conversation window if affirmative.

The third retrieval unit 1402 is specifically used for:

detect whether other text communication context associated with the text communication content exists in a preset number of messages before or after the text communication content in the instant communication conversation window.

More specifically, the third retrieval unit 1402 may determine whether the other text communication content associated with the text communication content exists in previous N or posterior M messages of the text communication content in the instant communication conversation window.

From the foregoing implementations, one skilled in the art may clearly know that the present disclosure can be implemented in terms of software and necessary general hardware platform. Based on this understanding, the technical solutions of the present disclosure in essence or the part of contribution to the existing technologies may be embodied in a form of a software product. The software product may be stored in storage media, such as ROM/RAM, a magnetic disk, an optical disk, etc., including multiple instructions to direct a computing device (a personal computer, a server or a network device, etc.) to perform the embodiments of the present disclosure or the methods described in certain parts of the embodiments.

Figure 15:
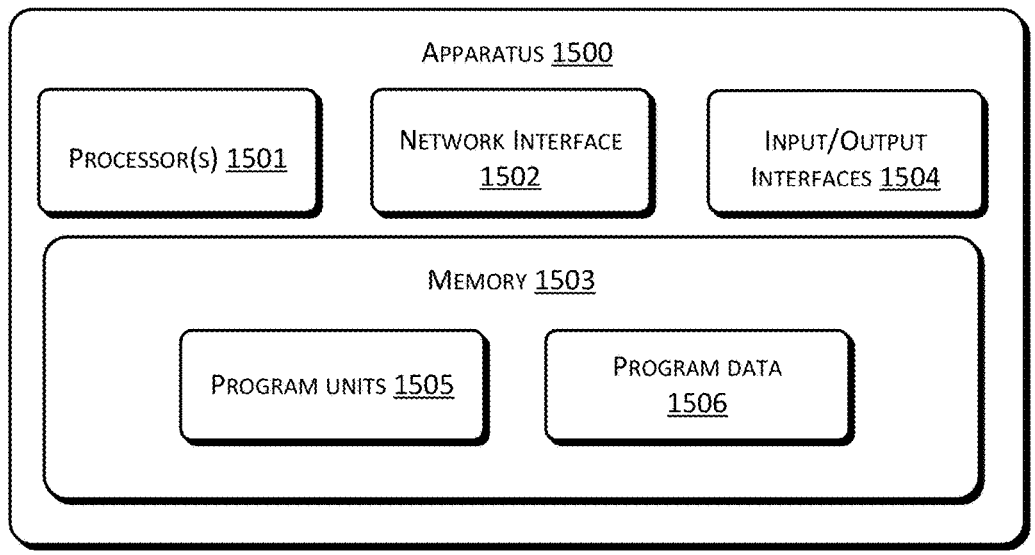
FIG. 15 is a schematic diagram of the apparatus as described in FIGS. 10-15 in more detail.

For example, FIG. 15 shows an example apparatus 1500, such as the apparatus as described above, in more detail. In an embodiment, the apparatus 1500 may include, but is not limited to, one or more processors 1501, a network interface 1502, memory 1503 and an input/output interface 1504.

The memory 1503 may include a form of computer readable media such as a volatile memory, a random access memory (RAM) and/or a non-volatile memory, for example, a read-only memory (ROM) or a flash RAM. The memory 1503 is an example of a computer readable media.

The computer readable media may include a volatile or non-volatile type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 1503 may include program units 1505 and program data 1506. Depending on whether the apparatus 1500 correspond to an apparatus for a sending client (such as the apparatus 1000), an apparatus for a receiving client (such as the apparatus 1100), an apparatus in a server (such as the apparatus 1200), etc., the program units 1505 may include different combinations of units and subunits. Details of these units and subunits may be found in the foregoing description and are therefore not redundantly described herein.

The embodiments of the present disclosure are described in a progressive manner, and the same or similar parts in different embodiments can be referenced with one another. Portions emphasized in each embodiment are different from other embodiments. Particularly, the description of the systems or the system embodiments is relatively simple because they are basically similar to the method embodiments, and related portions can be referenced to respective descriptions of the method embodiments. The foregoing systems and system embodiments are merely schematic. The units described herein as separate components may or may not be physically separate. And the unit serving as a displayed component may or may not be a physical unit, i.e., can be located at a single location or distributed among a plurality of network elements. All or parts of the modules may be selected according to actual needs for achieving an objective of the solution of the embodiment. One of ordinary skill in the art may comprehend and implement the embodiments without making any creative effort.

Detailed descriptions of the expression information processing methods and apparatuses in an instant communication process according to the present disclosure have been described above. The specification explains the principles and implementations of the present disclosure using specific embodiments. The foregoing embodiments are merely used for helping to understand the methods and core concepts of the present disclosure. Also, based on the concepts of the present disclosure, one of ordinary skill in the art may change specific implementations and scope of applications. In short, the present specification shall be not construed as limitations to the present disclosure.

What is claimed is:
1. A method comprising:
  providing an expression picture in an instant communication conversation window;
  acquiring information of a user operation activity from a sending user with respect to the expression picture;
  searching an expression database based on the expression picture and the obtained information of the user operation activity, the expression database including stored response messages and the stored response messages including calculation method information corresponding to an operation type;
  generating a first response message corresponding to the expression picture under the user operation activity, the generating the first response message comprising:

determining an operation type of the sending user on the expression picture, and acquiring information of a calculation method corresponding to the operation type; calculating, according to the information of the calculation method corresponding to the determined operation type related to the information of the user operation activity, response data corresponding to the expression picture under the information of the user operation activity; and generating, according to the response data, the first response message that matches with the information of the user operation activity; and sending found information relating to the expression picture and the acquired information of the user operation activity to a receiving client corresponding to a receiving user to facilitate the receiving client to generate a second response message corresponding to the expression picture under the user operation activity.

2. The method of claim 1, wherein the expression database further includes stored expression pictures and respective operation activity information used for starting the response messages.

3. The method of claim 2, wherein the operation activity information comprises information of an operation type.

4. The method of claim 1, wherein the calculation method is determined according to the operation type and an operational attribute information parameter corresponding to the operation type.

5. The method of claim 1, wherein acquiring the information of the user operation activity from the user with respect to the expression picture comprises:

acquiring information of an operation type performed by the sending user on the expression picture and attribute information corresponding to the operation type;

calculating, according to information of a calculation method corresponding to the determined operation type related to the information of the user operation activity, response data corresponding to the expression picture under the information of the user operation activity, wherein the calculating comprises:

determining the calculation method according to the acquired information of the operation type and the attribute information corresponding to the operation type; and calculating, according to the determined calculation method, the response data corresponding to the expression picture under the user operation activity information.

6. The method of claim 1, wherein the first response message comprises information having a continuity of playability in a time dimension, and the method further comprises:

acquiring a starting time point and an end time point of the user operation activity;

calculating a time duration of the user operation activity according to the starting time point and the end time point; and playing the first response message in the instant communication conversation window according to the time duration of the user operation activity.

7. The method of claim 6, wherein the information having the continuity of playability in the time dimension comprises an animation comprising a plurality of successive image frames, a display time interval being preset between adjacent image frames, and playing the first response message in the instant communication conversation window according to the time duration of the user operation activity comprises:

comparing a time duration of the user operation activity with a total duration of the animation;

determining an end frame that is to be played according to the time duration of the user operation activity and the display time interval between the adjacent image frames when the time duration of the user operation activity is less than the total duration of the animation; and playing the animation in the instant communication conversation window until the end frame is played.

8. The method of claim 6, wherein the information having the continuity of playability in the time dimension comprises an animation comprising a plurality of successive image frames, a display time interval being preset between adjacent image frames, and playing the first response message in the instant communication conversation window according to the time duration of the user operation activity comprises playing the animation in the instant communication conversation window until the animation is finished playing if the time duration of the user operation activity is greater than or equal to the total duration of the animation.

9. The method of claim 1, wherein the information of the user operation activity from the user with respect to the expression picture includes multiple pieces, multiple first response messages are correspondingly found from the first expression database, and the method further comprises generating a combined first response message using a part or all of the multiple first response messages.

10. The method of claim 1, wherein sending the information related to the expression picture and the acquired information of the user operation activity to the receiving client corresponding to the receiving party comprises:

sending the found information related to the expression picture and a part or all of the acquired information of the user operation activity to the receiving client corresponding to the receiving user to facilitate the receiving client to generate the second response message corresponding to the expression picture under a part or all of the user operation activity.

11. The method of claim 1, wherein, when multiple first response messages are found to correspond to the expression picture under the user operation activity, the method further comprises providing a prompt message to prompt the user to select one from the multiple first response messages.

12. The method of claim 1, wherein after providing the expression picture in the instant communication conversation window, the method further comprises displaying a prompt message that indicates to the user a capability of operating on the expression picture and operating mode information corresponding to the expression picture in the instant communication conversation window.

13. An expression information processing apparatus of a sending client in an instant communication process, the apparatus comprises:

an expression database set up in a server side in advance, the expression database storing expression pictures, response messages and operation activity information, and the response messages including calculation method information corresponding to an operation type; and a processor and a memory configured to implement the function of an expression picture provision unit, the expression picture provision unit providing an expression picture in an instant communication conversation window;

an operation activity information acquisition unit, the operation activity information acquisition unit acquiring information of a user operation activity sent from a user with respect to the expression picture; and an information uploading unit, the information uploading unit uploading the acquired information of the user operation activity, information relating to the expression picture, identification information of the user and identification information of a receiving user to a server to facilitate the server search the expression database based on the acquired information of the user operation activity to generate a first response message and a second response message corresponding to the expression picture under the user operation activity, return the first response message to a sending client corresponding to the user, and send the second response message to a receiving client corresponding to the receiving user.

14. One or more computer readable media storing executable instructions that, when executed by one or more processors, cause the one or more processors to perform acts comprising:

providing a first expression picture in an instant communication conversation window;

determining whether a target content in conformity with a condition for starting a response message corresponding to the first expression picture exists in an instant communication conversation message in response to determining that the expression picture exists in an expression database, the expression database including stored response messages and the stored response messages including calculation method information corresponding to an operation type; and generating the response message corresponding to the expression picture in response to determining that the target content in conformity with the condition for starting the response message corresponding to the expression picture exists in the instant communication conversation message.

15. The one or more computer readable media of claim 14, wherein the condition for starting the response message corresponding to the first expression picture stored in the expression database comprises: the instant communication conversation window comprising a second expression picture that is associated with the first expression picture, and determining whether the target content in conformity with the condition for starting the response message corresponding to the first expression picture exists in the instant communication conversation message, comprises determining whether the second expression picture associated with the first expression picture exists in the instant communication conversation window.

16. The one or more computer readable media of claim 14, wherein the condition for starting the response message corresponding to the expression picture stored in the expression database comprises: the instant communication conversation window comprising a text associated with the expression picture, and determining whether the target content in conformity with the condition for starting the response message corresponding to the expression picture exists in the instant communication conversation message, comprises analyzing text content displayed in the instant communication conversation window and determining whether a target text associated with the expression picture exists.

17. The one or more computer readable media of claim 14, the acts further comprising providing the target content or the response message corresponding to the target content to a user for selection if the target content in conformity with the condition for the response message corresponding to the expression picture in the instant communication conversation window includes multiple pieces.

18. The one or more computer readable media of claim 14, wherein determining whether the target content in conformity with the condition for starting the response message corresponding to the expression picture exists in the instant communication conversation window, comprises determining whether the target content in conformity with the condition for starting the response message corresponding to the expression picture exists in a preset number of messages that are before or after the expression picture in the instant communication conversation window.

19. The one or more computer readable media of claim 18, wherein determining whether the target content in conformity with the condition for starting the response message corresponding to the expression picture exists in the instant communication conversation window, comprises determining whether the target content in conformity with the condition for starting the response message corresponding to the expression picture exists in a previous or a posterior message of the expression picture in the instant communication conversation window.

* * * * *